US009018883B2

(12) United States Patent
Shibataka et al.

(10) Patent No.: US 9,018,883 B2
(45) Date of Patent: Apr. 28, 2015

(54) MOTOR DRIVE CIRCUIT

(75) Inventors: Taishi Shibataka, Kanagawa-ken (JP); Akira Fujita, Kanagawa-ken (JP)

(73) Assignee: Kabushiki Kaisha Toshiba, Tokyo (JP)

(*) Notice: Subject to any disclaimer, the term of this patent is extended or adjusted under 35 U.S.C. 154(b) by 236 days.

(21) Appl. No.: 13/607,109

(22) Filed: Sep. 7, 2012

(65) Prior Publication Data
US 2013/0249461 A1 Sep. 26, 2013

(30) Foreign Application Priority Data

Mar. 22, 2012 (JP) ................ P2012-065351

(51) Int. Cl.
G05B 11/28 (2006.01)
H02P 31/00 (2006.01)
H02P 6/00 (2006.01)
H02P 7/29 (2006.01)

(52) U.S. Cl.
CPC .............. *H02P 31/00* (2013.01); *H02P 6/002* (2013.01); *H02P 7/29* (2013.01)

(58) Field of Classification Search
USPC ............. 318/254, 293, 294, 432, 434, 400.3, 318/400.13, 400.27, 254.1, 599
See application file for complete search history.

(56) References Cited

U.S. PATENT DOCUMENTS

| | | | | |
|---|---|---|---|---|
| 8,044,617 | B2* | 10/2011 | Lee | 318/380 |
| 8,461,782 | B2* | 6/2013 | Ward et al. | 318/5 |
| 2008/0310046 | A1* | 12/2008 | Menegoli et al. | 360/75 |
| 2011/0031917 | A1* | 2/2011 | Shimizu | 318/400.27 |
| 2013/0038260 | A1* | 2/2013 | Chang et al. | 318/400.35 |
| 2013/0147278 | A1* | 6/2013 | Arisawa et al. | 307/75 |

FOREIGN PATENT DOCUMENTS

| | | |
|---|---|---|
| JP | 2002-204150 | 7/2002 |
| JP | 2008-160966 | 7/2008 |
| JP | 2011-114739 | 6/2011 |

* cited by examiner

*Primary Examiner* — Rina Duda
*Assistant Examiner* — Bickey Dhakal
(74) *Attorney, Agent, or Firm* — Patterson & Sheridan, LLP

(57) ABSTRACT

A motor drive circuit operates in a first mode in which the output current flowing to a first output terminal from a second output terminal is increasing or in a second mode in which the output current flowing to the first output terminal from the second output terminal is decayed. In the first mode, a first voltage signal is output from the first signal terminal and the ground voltage output from the second signal terminal and, in the second mode, a ground voltage is output from the first signal terminal and a second voltage signal is output from the second signal terminal. The motor drive circuit compares the signals output from the first and second signal terminals and output comparison results to a control unit for controlling the output current through the motor coil.

15 Claims, 13 Drawing Sheets

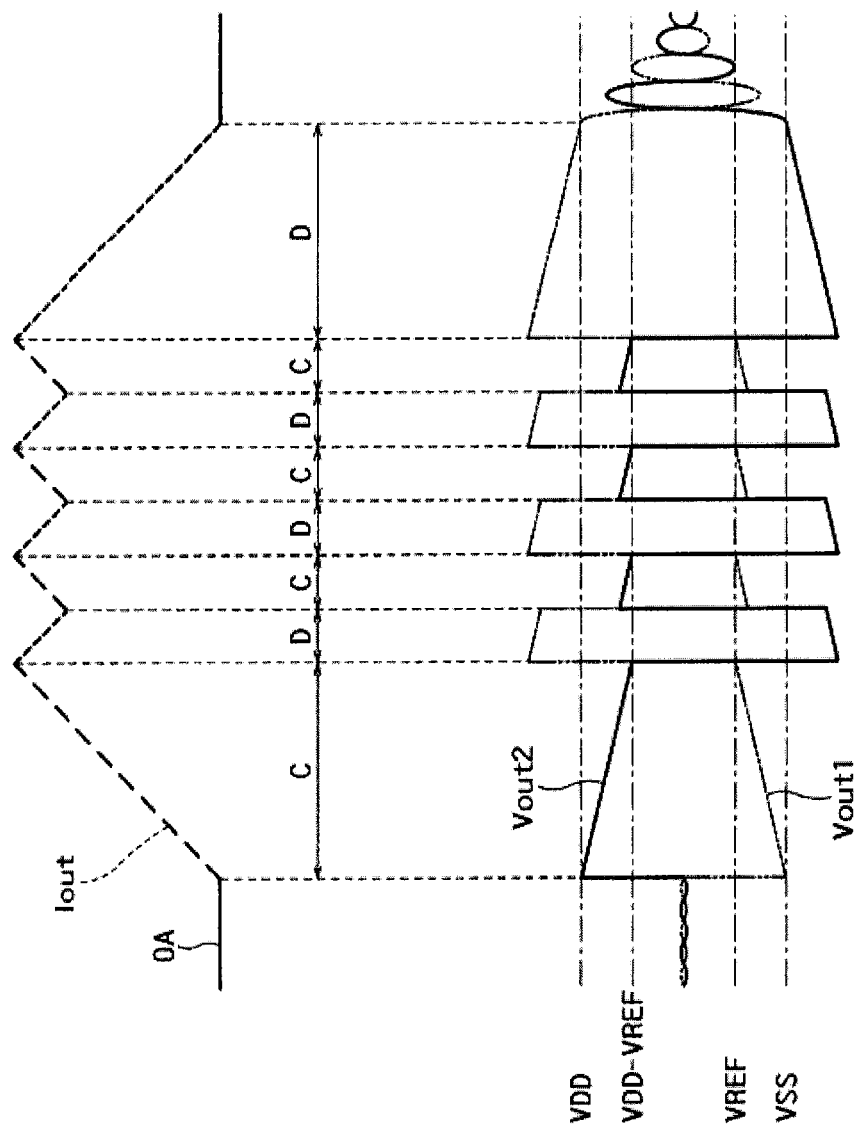

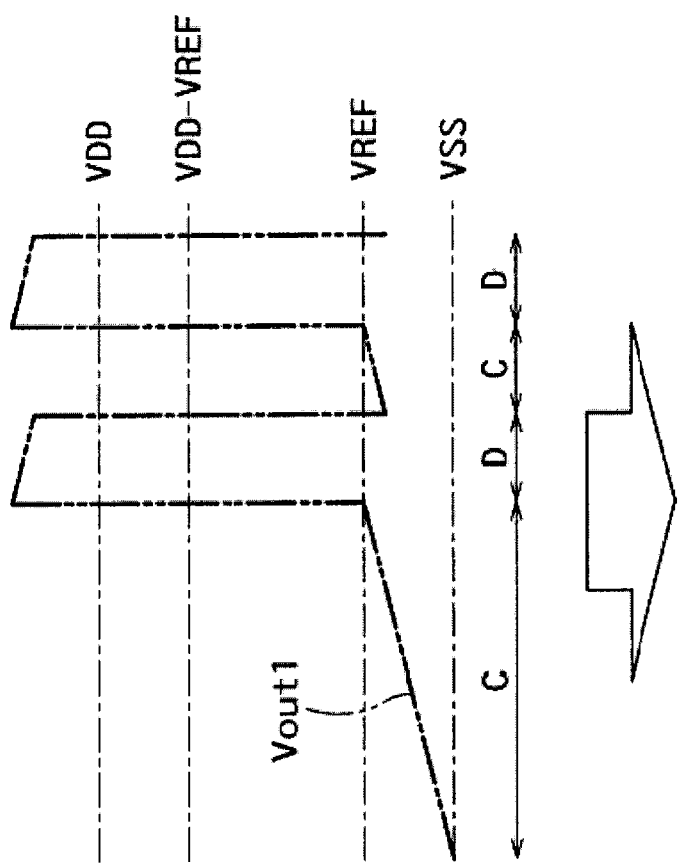

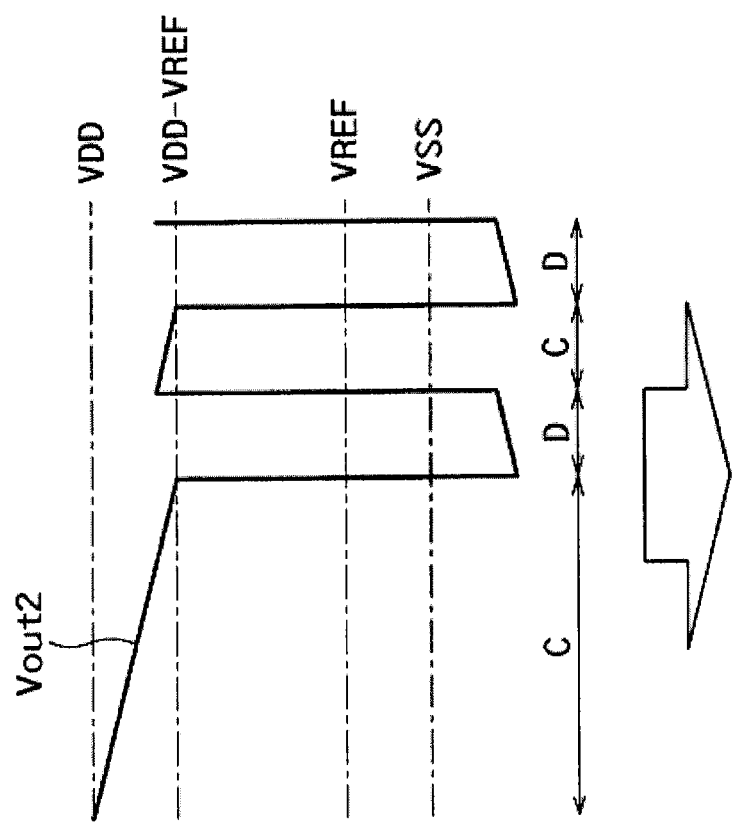

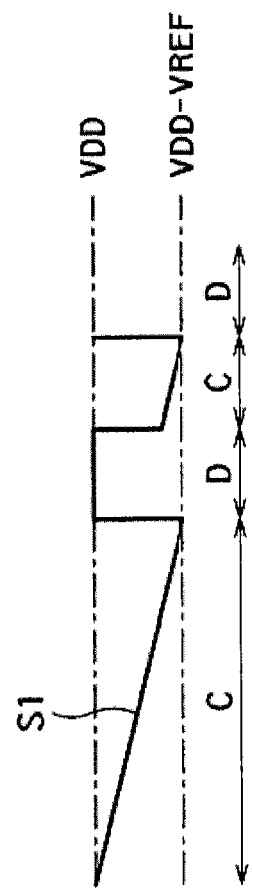

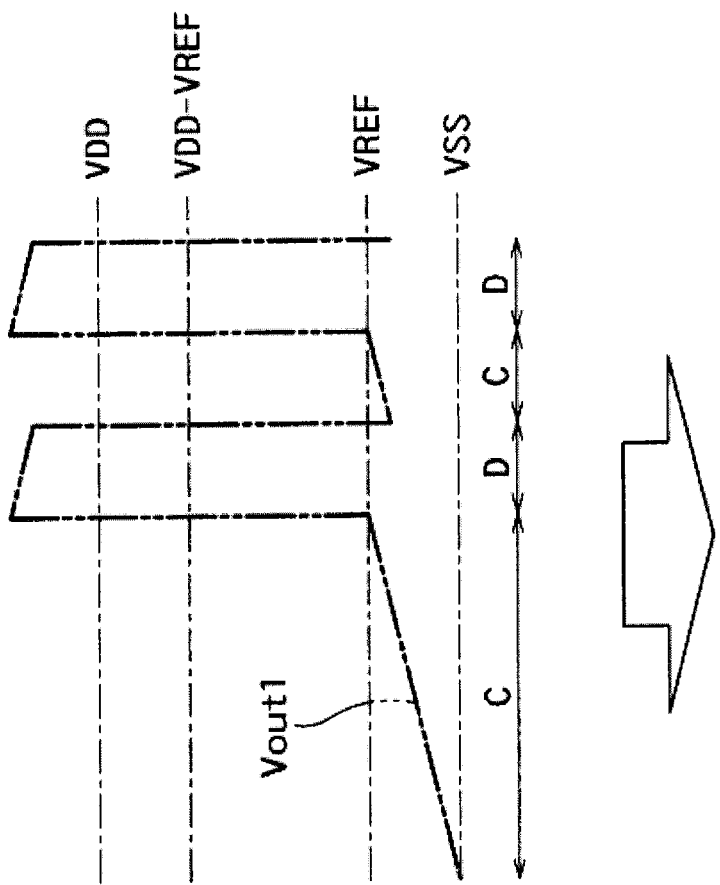

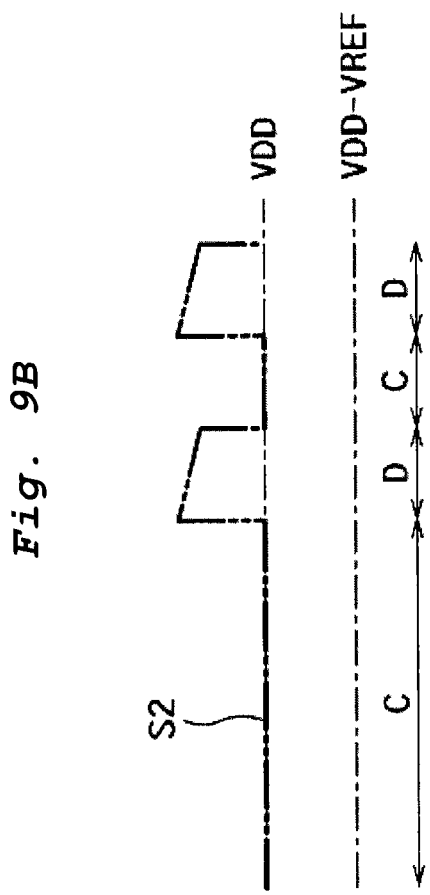

MOTOR DRIVE CIRCUIT

CROSS-REFERENCE TO RELATED APPLICATION

This application is based upon and claims the benefit of priority from Japanese Patent Application No. 2012-065351, filed Mar. 22, 2012; the entire contents of which are incorporated herein by reference.

FIELD

Embodiments described herein relate to a motor drive circuit.

BACKGROUND

Motor drive circuits compare the potential in an RS resistance connected to an H-bridge circuit using comparators, and control the output current flowing into a coil of the motor by controlling the H-bridge circuit by PWM (Pulse Width Modulation) control based on the comparison result.

However, the potential in the RS resistance, when in the decay mode is a negative potential, and a zero point detection is implemented by comparing this potential with ground voltage. In addition, it is desirable to omit the RS resistance so that the number of parts can be reduced.

DESCRIPTION OF THE DRAWINGS

FIG. 3 is a diagram that shows an example of an output current, a first voltage signal, and the wave shape of a second voltage signal.

FIGS. 4A and 4B are diagrams that show example waveforms processed in the signal control circuit of FIG. 1.

FIGS. 5A and 5B are diagrams that show further example waveforms processed in the signal control circuit of FIG. 1.

FIGS. 8A and 8B are diagrams that show example waveforms processed by the signal control circuit of FIG. 6.

FIGS. 9A and 9B are diagrams that show further example waveforms processed by the signal control circuit of FIG. 6.

DETAILED DESCRIPTION

In general, embodiments will be explained with reference to the drawings.

According to one embodiment, there is provided a motor drive circuit that can detect electric currents and zero points without implementing RS resistance, thereby cutting costs.

A motor drive circuit according to an embodiment includes a first output terminal that is connected to one end of a motor coil, a second output terminal connected to the other end of the motor coil, and an H-bridge circuit having a first switch element with one end connected to a power supply and the other end connected to a first output terminal, a second switch element with one end connected to the ground and the other end connected to the first output terminal, a third switch element with one end connected to the power supply and the other end connected to a second output terminal, and a fourth switch element with one end connected to the ground and the other end connected to the second output terminal. The motor drive circuit further includes a PWM control circuit controlling the output current flowing into the motor coil by controlling the first to fourth switch elements through pulse-duration modulation (PDM), and supplies a first voltage signal of the first output terminal and a second voltage signal of the second output terminal. In the case of the first mode when the output current from the second output terminal to the first output terminal increases, the first voltage signal is output through the first signal terminal and ground voltage is output through the second signal terminal. On the other hand, in the case of the second mode when the output current is from the second output terminal to the first output terminal is decayed, the ground voltage is output through the first signal terminal and the second voltage signal is output through the second signal terminal. An electric current detecting comparator of the motor drive circuit compares the signal output from the first signal terminal with standard voltage and outputs a current-detecting signal according to the comparison result. A zero point detector comparator of the motor drive circuit compares the signal output from the second signal terminal with the ground voltage and outputs a zero point detecting signal according to the comparison result.

(Embodiment 1)

Figure 1:
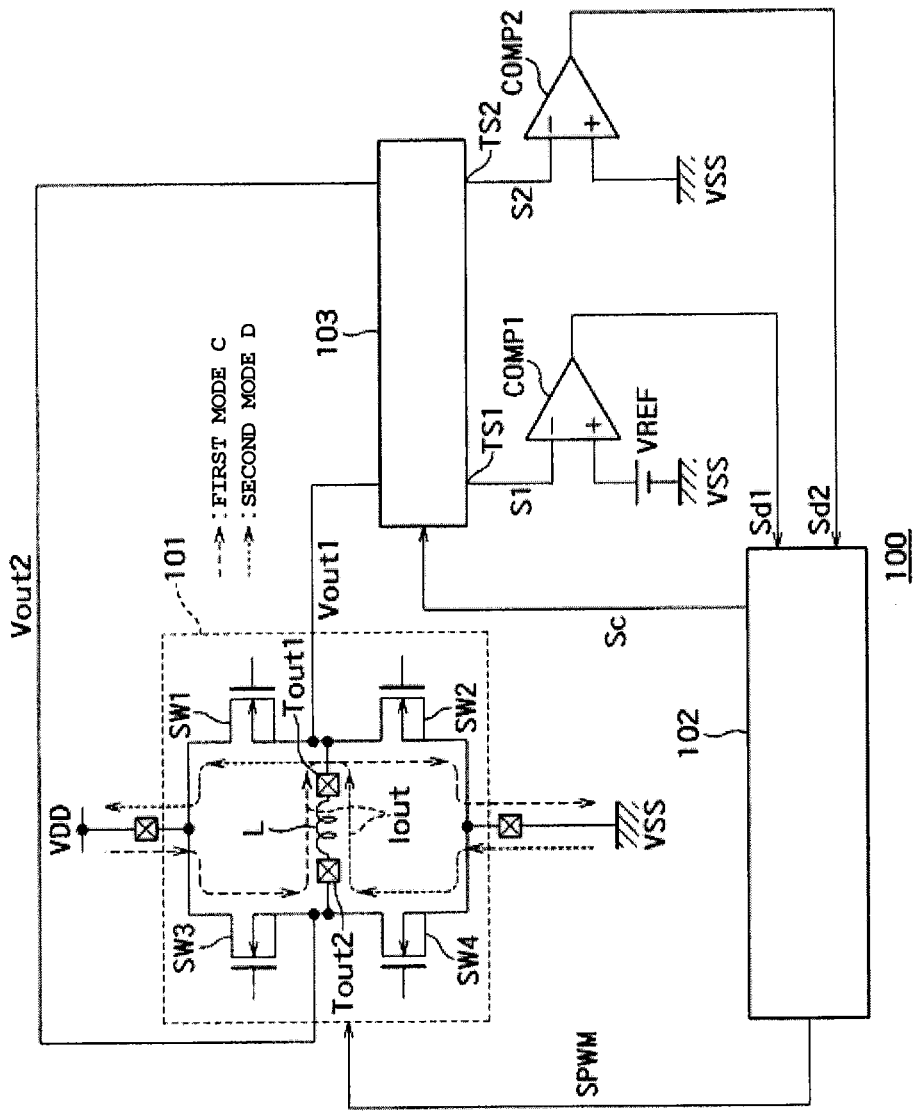
FIG. 1 is a diagram that shows an example of a motor drive circuit according to a first embodiment.

FIG. 1 is a diagram that shows a motor drive circuit according to Embodiment 1.

As can be seen in FIG. 1, a motor drive circuit 100 is equipped with a first output terminal Tout1, a second output terminal Tout2, an H-bridge circuit 101, a PWM (pulse width modulation) control circuit 102, a signal control circuit 103, an electric current detection comparator COMP 1 and a zero point detector comparator COMP 2.

The first output terminal Tout1 is connected to one end of a motor coil L. The second output terminal Tout2 is connected to the other end of coil L. The coil L may be a stepping motor coil or a DC motor coil.

The H-bridge circuit 101 includes a first switch element (e.g., an nMOS transistor) SW1, a second switch element (e.g., an nMOS transistor) SW2, a third switch element SW3 and a fourth switch element SW4. One end of the first switch element SW1 is connected to a power supply and the other end is connected to the first output terminal Tout1. One end of the second switch element SW2 is connected to the ground and the other end is connected to the first output terminal Tout1. One end of the third switch element SW3 is connected to the power supply and the other end is connected to the second output terminal Tout2. One end of the fourth switch element SW4 is connected to the ground and the other end is connected to the second output terminal Tout2. In alternative embodiments, the H-bridge circuit 101 may be configured with pMOS transistors or bipolar transistors.

The PWM control circuit 102 controls output current Iout flowing into coil L by controlling the first to fourth switch elements SW1-SW4 by means of a PDM signal SWPM. If the coil L is a stepping motor coil or a brushless DC motor coil, the electric current flowing into coil L is controlled sinusoidally.

The first voltage signal Vout1 of the first output terminal Tout1 and the second voltage signal Vout2 of the second output terminal Tout2 are supplied to a signal control circuit 103. The signal control circuit 103 outputs the first voltage signal Vout1 through a first signal terminal TS1 and a ground voltage VSS through a second signal terminal TS2 in the case of a first mode C (CHARGE), when output current Iout flowing into coil L from the second output terminal Tout2 to the first output terminal Tout1 increases. On the other hand, signal control circuit 103 outputs the ground voltage VSS through the first signal terminal TS1 and the second voltage signal Vout2 through the second signal terminal TS2 in the case of a second mode D (DECAY), when output current Iout from the second output terminal Tout2 to the first output terminal Tout1 decays.

The electric current comparator COMP1 compares signal S1 that is output through the first signal terminal TS1 with a standard voltage VREF, and outputs an electric current detection signal Sd1 according to the comparison result. The zero point detection comparator COMP2 compares signal S2 that is output through the second signal terminal TS2 with the ground voltage VSS, and outputs a zero inspection signal Sd2 according to the comparison result.

The PWM control circuit 102 outputs a mode signal Sc corresponding to a first mode C or a second mode D to signal control circuit 103. The signal control circuit 103 controls the signals output from first signal terminal TS1 and second signal terminal TS2 based on mode signal Sc.

The PWM control circuit 102 controls the shift between the first mode C and the second mode D by controlling first to fourth switch elements SW1-SW4 based on the electric current detection signal Sd1. The PWM control circuit 102 maintains the output current Iout in the first mode C by controlling first to fourth switch elements SW1-SW4 when the electric current detection signal Sd1 indicates that the first voltage signal Vout1 is between ground voltage VSS and standard voltage VREF. The PWM control circuit 102 changes the output current Iout from the first mode C to the second mode D by controlling first to fourth switch elements SW1-SW4 when the electric current detection signal Sd1 indicates that the first voltage signal Vout1 is equal to the standard voltage VREF.

In the PWM control circuit 102, after shifting the output current Iout from the first mode C to the second mode D, a shift in the output current Iout from the second mode D to the first mode C is made by controlling first to fourth switch elements SW1-SW4 after a designated period has passed. Moreover, PWM control circuit 102 controls first to fourth switch elements SW1-SW4 by turning them off when zero point detection signal Sd2 and second voltage signal Vout2 indicate that they have reached ground voltage VSS. As such, even if second voltage signal Vout2 overshoots after becoming ground voltage VSS, first to fourth switch elements SW1-SW4 can be turned off appropriately and the circuit can be protected.

Figure 2:
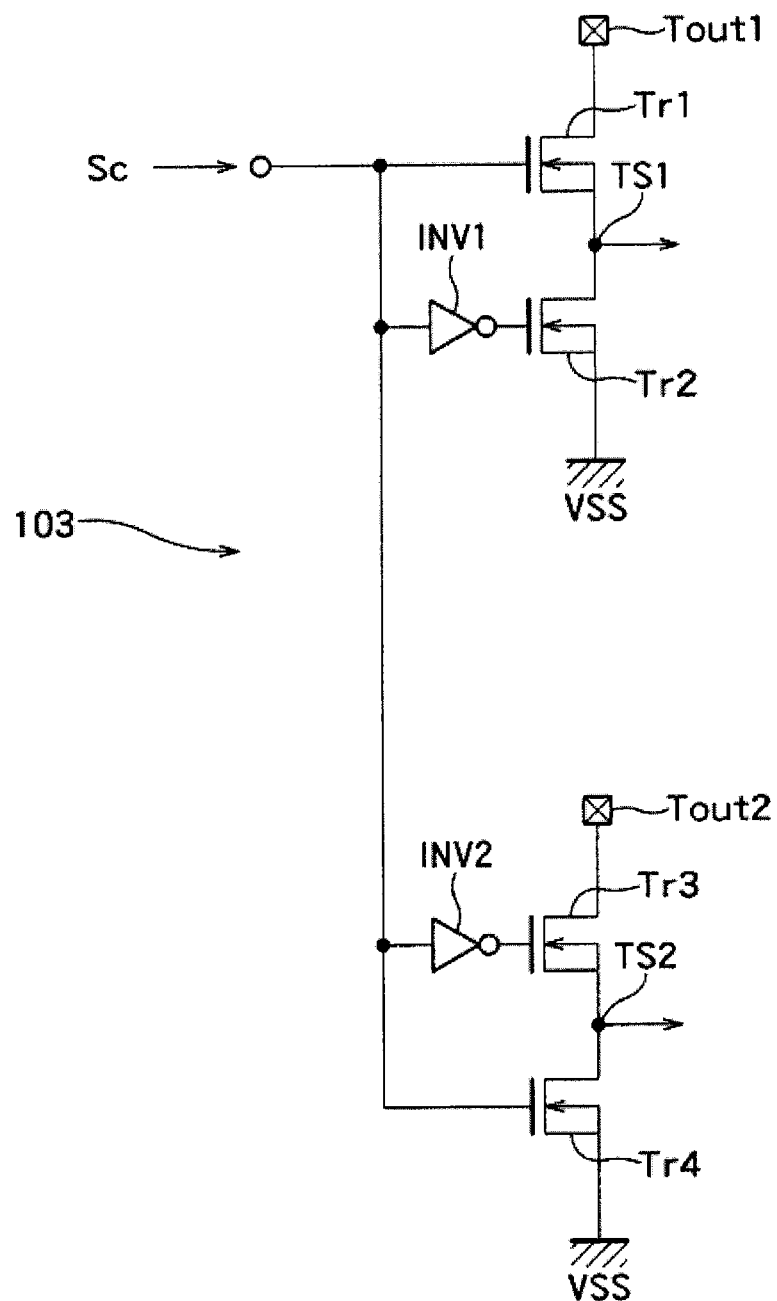
FIG. 2 is a diagram that shows an example signal control circuit of FIG. 1 in detail.

FIG. 2 is a diagram that shows the signal control circuit 103 shown in FIG. 1 in detail.

The signal control circuit 103, as shown in FIG. 2, includes first transistor (nMOS transistor) Tr1, second transistor (nMOS transistor) Tr2, third transistor (nMOS transistor) Tr3, fourth transistor (nMOS transistor) Tr4, first inverter INV1, and second inverter INV2. The first transistor Tr1 has one end (drain) connected to the first output terminal and the other end (source) connected to the first signal terminal TS1. Mode signal Sc is supplied to a gate of the first transistor Tr1. The second transistor Tr2 has one end (drain) connected to the first signal terminal TS1 and the other end (source) connected to the ground. The mode signal Sc is supplied to a first inverter INV1 and the output of the first inverter INV1 is connected to a gate of the second transistor Tr2. The third transistor Tr3 has one end (drain) connected to the second output terminal Tout2 and the other end (source) connected to a second signal terminal TS2. The mode signal Sc is supplied to a second inverter INV2 and the output of the second inverter INV2 is connected into a gate of the third transistor Tr3. The fourth transistor Tr4 has one end (drain) connected to the second signal terminal TS2 and the other end (source) connected to the ground. Mode signal is supplied to a gate of the fourth transistor Tr4.

The first to fourth transistors Tr1-Tr4 are of the same conductivity type. Moreover, the signal control circuit 103 can be formed by a pMOS transistor or a bipolar transistor.

The signal control circuit 103 controls first transistor Tr1 and second transistor Tr2 on/off in a mutually exclusive manner and third transistor Tr3 and fourth transistor Tr4 on/off in a mutually exclusive manner with first transistor Tr1 and fourth transistor Tr4 being on/off at corresponding periods in response to mode signal Sc.

Figure 4B:
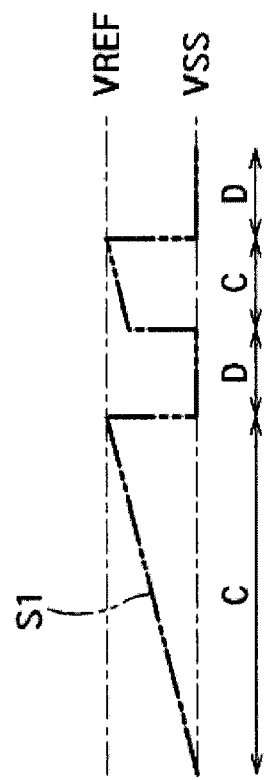
Figure 5B:
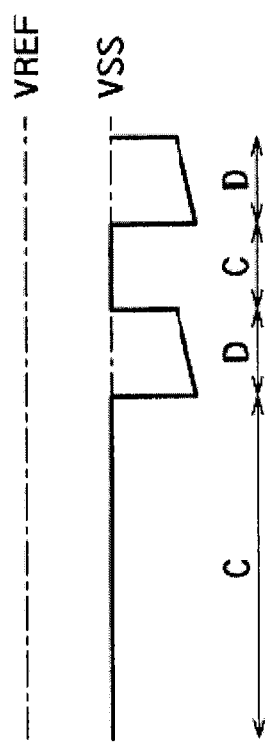

Next, an example operation of the motor drive circuit 100 possessing the configuration described above will be explained. FIG. 3 is a diagram showing an example of output current Iout, first voltage signal Vout1 and second voltage signal Vout2 waveform. In addition, FIGS. 4A and 4B are diagrams showing an example of first voltage signal Vout1 waveform (a) and signal S1 waveform (b) output from first signal terminal TS1 of signal control circuit 103. FIGS. 5A and 5B are diagrams showing an example of second voltage signal Vout2 waveform (a) and signal S2 waveform (b) output from second signal terminal TS2 of signal control circuit 103.

The PWM control circuit 102 first increases output current Iout in the first mode C as seen in FIG. 3 and FIGS. 4A and 4B. The signal control circuit 103 outputs the signal S1 as the equivalent first voltage signal Vout1 from first signal terminal TS1 (FIGS. 4A and 4B) and the signal S2 as the equivalent ground voltage VSS from second signal terminal TS2 (FIGS. 5A and 5B) based on mode signal Sc. The electric current comparator COMP1 compares signal S1 output from first signal terminal TS1 with standard voltage VREF and outputs electric current detection signal Sd1 in response to the comparison result.

The PWM control circuit 102 determines that electric current detector Sd1 indicates that the first voltage signal Vout1 is between ground voltage VSS and standard voltage VREF, so it maintains output current Iout in the first mode C by controlling first to fourth switch elements SW1-SW4. On the other hand, zero point detection comparator COMP2 compares signal S2 as the equivalent ground voltage VSS with ground voltage VSS. In this case, the zero point detection signal Sd2 based on the comparison result is masked.

After that, if PWM control circuit 102 determines that electric current detection signal Sd1 and first voltage signal Vout1 has reached standard voltage VREF, it shifts output current Iout from the first mode C to the second mode D by controlling first to fourth switch elements SW1-SW4. The signal control circuit 103, at this time, outputs signal S1 as the equivalent ground voltage VSS from first signal terminal TS1 based on mode signal Sc (FIGS. 4A and 4B), and outputs second signal S2 as the equivalent second voltage signal Vout2 from second signal terminal TS2 (FIGS. 5A and 5B).

The electric current detection comparator COMP1, then, compares signal S1 as the equivalent ground voltage VSS with standard voltage VREF. In this case, the electric current detection signal Sd1 based on the comparison result is masked. On the other hand, zero point detection comparator COMP2 compares signal S2 as the equivalent second voltage signal Vout2 with ground voltage VSS and outputs zero point detection signal Sd2 based on the comparison result.

The PWM control circuit 102 then shifts the output current Iout from the second mode D to the first mode C by controlling first to fourth switch elements SW1-SW4 after passage of a predetermined amount of time after shifting the output current Iout from the first mode C to the second mode D.

The same process is then repeated. The electric current detection by the electric current detection comparator COMP1 becomes effective for the first mode C and zero point detection by the zero point detection comparator COMP2 becomes effective for the second mode D in this way.

Furthermore, first voltage signal Vout1 and second voltage signal Vout2 are symmetrical about voltage (Hi-Z) as a center, in the case output current Iout is zero, as shown in FIG. 3.

Electric current detection and zero point detection can be done as described above without using RS resistance and thus cutting the costs of a motor drive circuit.

(Embodiment 2)

Figure 6:
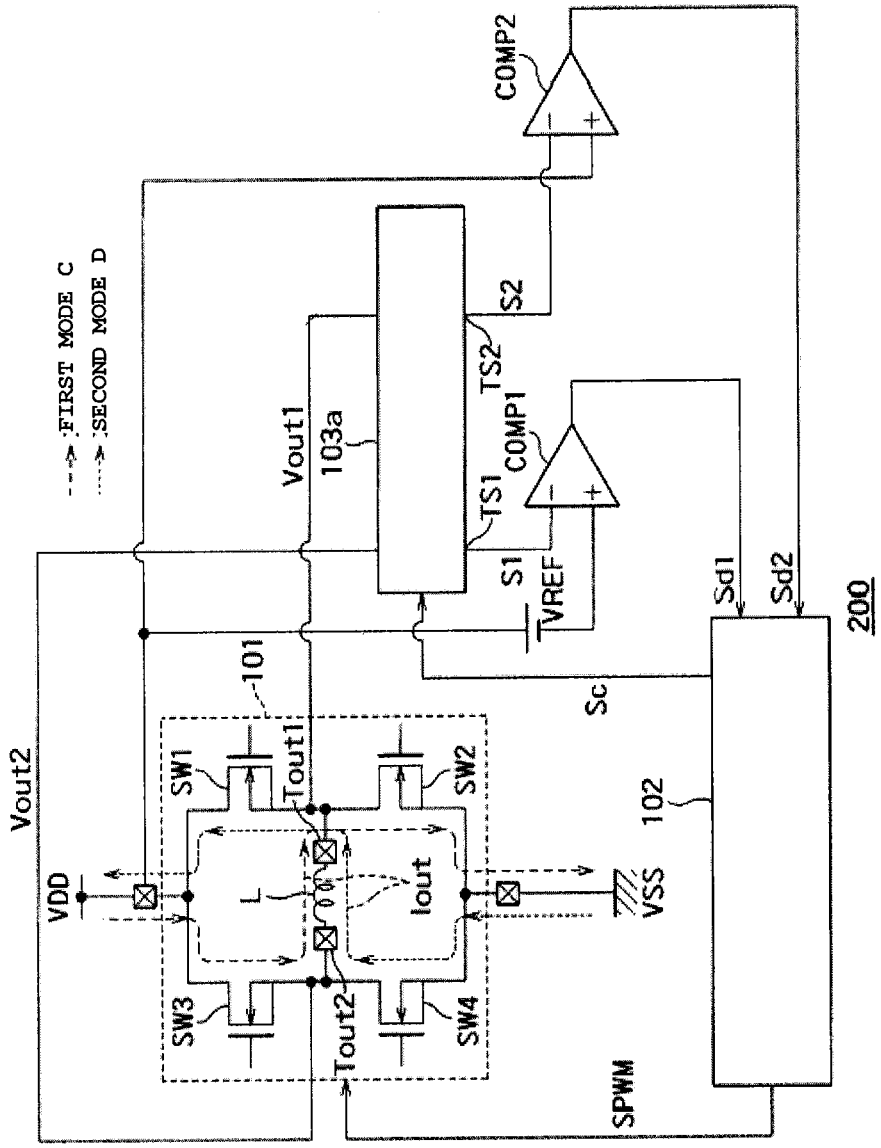
FIG. 6 is a diagram that shows an example of a motor drive circuit according to a second embodiment.

FIG. 6 is a diagram showing a motor drive circuit according to Embodiment 2. In FIG. 6, the same symbols as FIG. 1 are used to identify elements that are common between Embodiment 1 and Embodiment 2.

A motor drive circuit 200 is equipped with first output terminal Tout1, second output terminal Tout2, H-bridge circuit 101, PWM control circuit 102, signal control circuit 103a, electric current detection comparator COMP1, and zero point detection comparator COMP2, as shown in FIG. 6.

The electric current detection comparator COMP1 compares signal S1 output from first signal terminal TS1 with a voltage (VDD-VREF) to which the standard voltage VREF was pulled from the power supply voltage VDD and outputs electric current detection signal Sd1 in response to the comparison result.

The first voltage signal Vout1 of first output terminal Tout1 and the second voltage signal Vout2 of second output terminal Tout2 are supplied to a signal control circuit 103a. In the first mode C in which case the output current Iout flowing from second output terminal Tout2 toward first output terminal Tout1 is increasing, the signal control circuit 103a outputs second voltage signal Vout2 through first signal terminal TS1 and power supply voltage VDD through second signal terminal TS2. In the second mode D, in which output current Iout flowing from second output terminal Tout2 toward first output terminal Tout1 decays, the signal control circuit 103a outputs power supply voltage VDD through first signal terminal TS1 and first voltage signal Vout1 through second signal terminal TS2.

In the case the electric current detection signal Sd1 indicates that the second voltage signal Vout2 is between power supply voltage VDD and voltage (VDD-VREF), PWM control circuit 102 maintains the output current Iout in the first mode C by controlling first to fourth switch elements SW1-SW4.

In the case the electric current detection signal Sd1 indicates that the second voltage signal Vout2 of PWM control circuit 102 has reached voltage (VDD-VREF), PWM control circuit 102 shifts the output current Iout from the first mode C to the second mode D by controlling first to fourth switch elements SW1-SW4.

In addition, in the case the zero point detection signal Sd2 indicates that the first voltage signal Vout1 has reached power supply voltage VDD, PWM control circuit 102 controls first to fourth switch elements SW1-SW4 to be turned off.

The zero point detection comparator COMP2 then compares signal S2 output from second signal terminal TS2 with power supply voltage VDD, and outputs zero point detection signal Sd2 based on the comparison result.

In the case the zero point detection signal Sd2 indicates that second voltage signal Vout2 has reached power supply voltage VDD, PWM control circuit 102 controls the first to fourth switch elements SW1-SW4 to be turned off.

Figure 7:
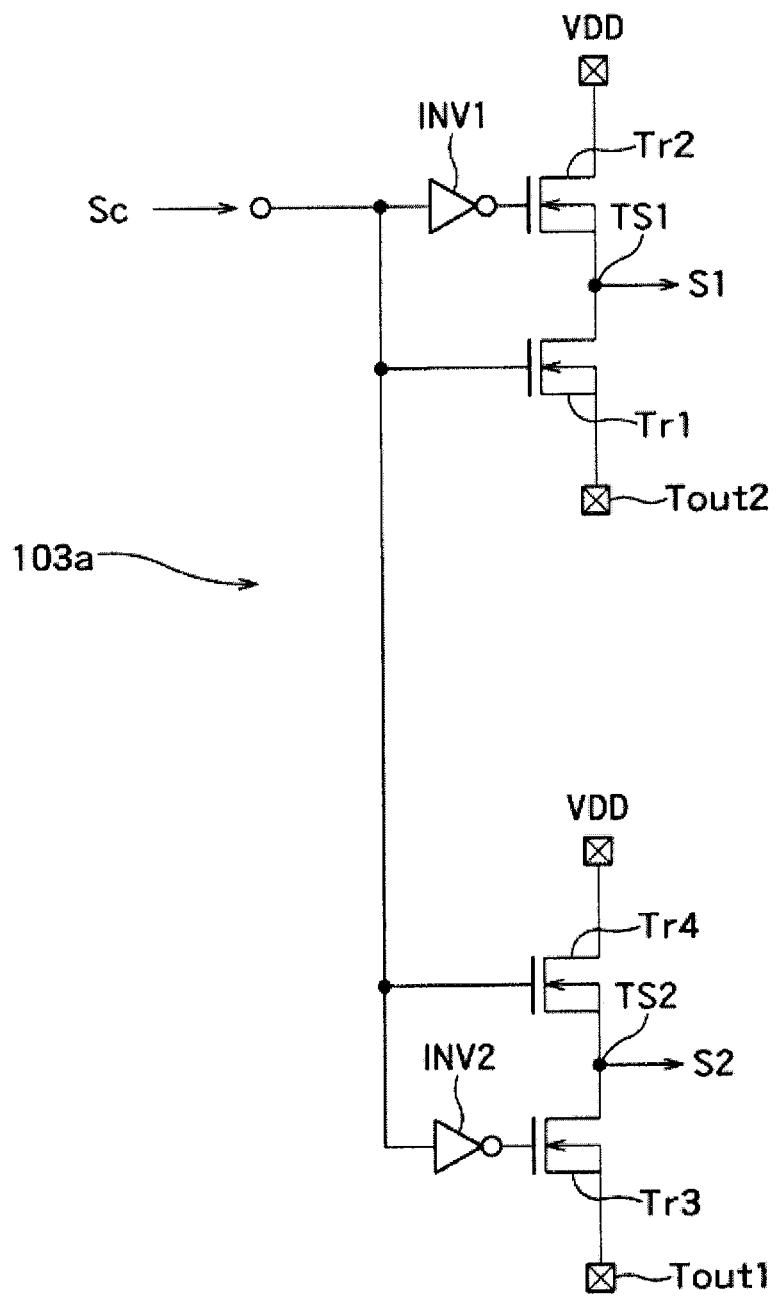
FIG. 7 is a diagram that shows an example of the signal control circuit of FIG. 6 in detail.

FIG. 7 is a diagram that shows an example of the signal control circuit 103a in FIG. 6 in detail. Moreover, the same symbols of FIG. 2 display the same composition as the embodiment 1 in FIG. 7.

As is shown in FIG. 7, signal control circuit 103a includes the first transistor (nMOS transistor) Tr1, the second transistor (nMOS transistor) Tr2, the third transistor (nMOS transistor) Tr3, the fourth transistor (nMOS transistor) Tr4, the first inverter INV1, and the second inverter INV2.

The first transistor Tr1 has one end (drain) connected to the second output terminal Tout2 and the other end (drain) connected to the first signal terminal TS1. The mode signal Sc is supplied to a gate of the first transistor Tr1. The second transistor Tr2 has one end (source) connected to the first signal terminal TS1 and the other end (drain) connected to the power supply. The mode signal Sc is supplied to the first inverter INV1 and the output of the first inverter INV1 is connected to a gate of the second transistor Tr2. The third transistor Tr3 has one end (source) connected to the first output terminal Tout1 and the other end (drain) connected to the second signal terminal TS2. The mode signal Sc is supplied to the second inverter INV2 and output of the second inverter INV2 is connected to a gate of the third transistor Tr3. The fourth transistor Tr4 has one end (source) connected to the second signal terminal TS2 and the other end (drain) connected to the power supply. The mode signal Sc is supplied to a gate of the fourth transistor Tr4.

The first to fourth transistors Tr1-Tr4 are of the same conductivity types. Moreover, this signal control circuit 103a can be composed of pMOS or bipolar transistors.

The signal control circuit 103a controls the first transistor Tr1 and the second transistor Tr2 by turning them on/off in a mutually exclusive manner and the third transistor Tr3 and the fourth transistor Tr4 on/off in a mutually exclusive manner with the first transistor Tr1 and the fourth transistor Tr4 being on/off at corresponding periods in response to mode signal Sc.

Furthermore, the signal control circuit 103a can be composed of pMOS and bipolar transistors.

Other compositions and functions of the motor drive circuit 200 are the same as the motor drive circuit 100 of Embodiment 1.

Figure 8A:
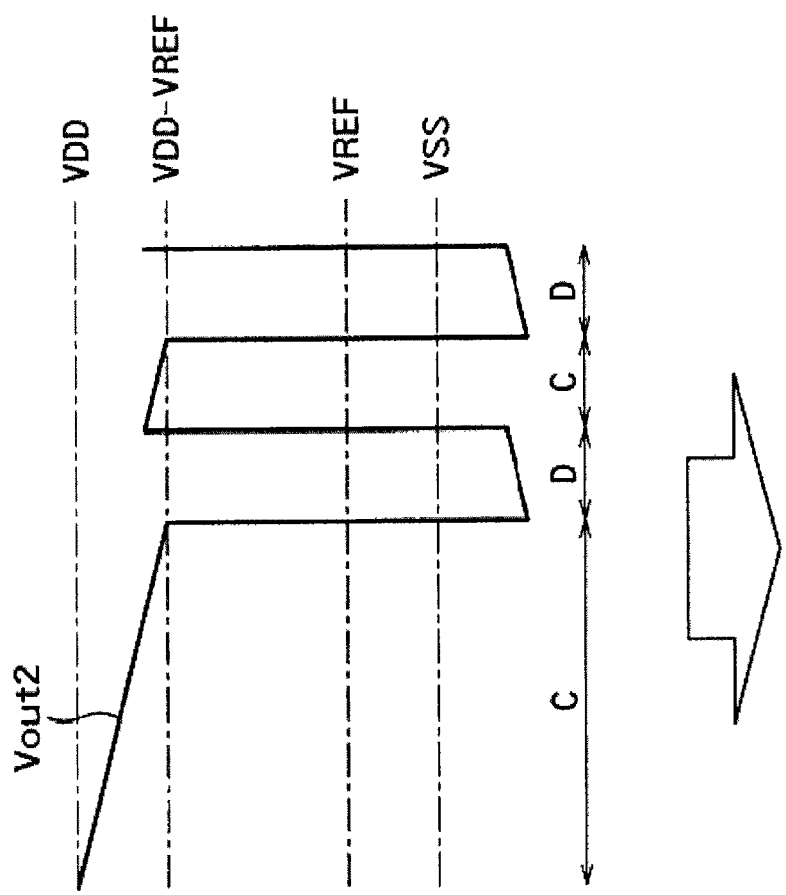

Next, an example operation of the motor drive circuit 200 that is configured as described above will be explained. FIGS. 8A and 8B are diagrams that display an example of signal S1 waveform (b) that is output from first voltage signal Vout1 waveform (a) and first signal terminal TS1 of signal control circuit 103a. In addition, FIGS. 9A and 9B are diagrams that display an example of signal S2 waveform (b) that is output from second voltage signal Vout2 waveform (a) and second signal terminal TS2 of signal control circuit 103a. Moreover, waveforms of the output current Tout, the first voltage signal Vout1 and the second voltage signal Vout2 are the same as in FIG. 3.

The PWM control circuit 102 increases the output current Iout in the first mode C as shown in FIG. 3 and FIGS. 8A and 8B. At this time, the signal control circuit 103 outputs the signal S1 as the equivalent first voltage signal Vout1 from the first signal terminal TS1 (FIGS. 8A and 8B), and the signal S2 as the equivalent ground voltage VSS from the second signal terminal TS2 (FIGS. 9A and 9B) based on a mode signal Sc. The electric current detection comparator COMP1 then compares a signal S1 output from the first signal terminal TS1 with voltage (VDD-VREF) and outputs an electric current detection signal Sd1 based on the comparison result.

As such, the PWM control circuit 102 determines that the second voltage signal Vout2 is between the power supply voltage VDD and the voltage (VDD-VREF), so the output current Iout maintains the first mode C by controlling the first to fourth switch elements SW1-SW4.

On the other hand, the zero point detection comparator COMP2 compares the signal S2 as the equivalent power supply voltage VDD with the power supply voltage VDD. In this case, a zero point detection signal Sd2 based on the comparison result is masked.

After that, when the electric detection signal Sd1 indicates that the second voltage signal Vout2 has reached voltage (VDD-VREF), PWM control circuit 102 shifts the output current Iout from the first mode C to the second mode D by controlling the first to fourth switch elements SW1-SW4.

At this time, the signal control circuit 103 outputs the signal S1 as the equivalent power supply voltage VDD from the first signal terminal TS1 (FIGS. 8A and 8B) and the signal S2 as the equivalent first voltage signal Vout1 from the second signal terminal TS2 (FIGS. 9A and 9B) based on the mode signal Sc.

The electric current detection comparator COMP1 then compares the signal S1 as the equivalent power supply voltage VDD with voltage (VDD-VREF). In this case, the electric current detection signal Sd1 based on the comparison result is masked.

The zero point detection comparator COMP2, on the other hand, compares the signal S2 as the equivalent first voltage signal Vout1 with the power supply voltage VDD and outputs the zero point detection signal Sd2 based on the comparison result.

After that, the PWM control circuit 102 shifts the output current Iout from the second mode D to the first mode C by controlling the first to fourth switch elements SW1-SW4 after passage of predetermined amount of time after shifting the output current Iout from the first mode C to the second mode D.

The same process is then repeated. The electric current detection by the electric current detection comparator COMP1 becomes effective for the first mode C and zero point detection by the zero point detection comparator COMP2 becomes effective for the second mode D in this way.

Electric current detection and zero point detection can be done in Embodiment 2 in the same way as Embodiment 1 without the RS resistance to thereby cut costs of the motor drive circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A motor drive circuit comprising:
   a first output terminal connected to a first end of a motor coil;
   a second output terminal connected to a second end of the motor coil;
   an H bridge circuit including:
   a first switch element having a first end connected to a power supply and a second end connected to the first output terminal,
   a second switch element having a first end connected to ground and a second end connected to the first output terminal,
   a third switch element having a first end connected to the power supply and a second end connected to the second output terminal,
   a fourth switch element having a first end connected to ground and a second end connected to the second output terminal,
   a PWM control circuit controlling the output current flowing into the motor coil by controlling the first to fourth switch elements;
   a signal control circuit that is supplied with first and second voltage signals from the first and second output terminals, and outputs the first voltage signal and the second voltage signal in accordance with an operating mode, wherein, in a first operating mode, the first voltage signal is output through a first signal terminal and power supply voltage is output through a second signal terminal; and, in a second operating mode, the power supply voltage is output through the first signal terminal and the second voltage signal is output through the second signal terminal; and
   an electric current detecting comparator that compares the signal output through the first signal terminal with a first reference voltage and supplies a comparison result signal to the PWM control circuit; and
   a zero point detecting comparator that compares the signal output through the second signal terminal with a second reference voltage and supplies a comparison result signal to the PWM control circuit,
   wherein the PWM control circuit controls the first to fourth switch elements based on the comparison result signals.

2. The motor drive circuit according to claim 1, wherein, in the first operating mode, the output current flowing into the motor coil from the second output terminal toward the first output terminal is increasing and in the second operating mode, the output current flowing into the motor coil from the second output terminal toward the first output terminal is decaying.

3. The motor drive circuit according to claim 2, wherein the PWM control circuit controls the first to fourth switch elements based on the comparison result signal from the electric current detecting comparator.

4. The motor drive circuit according to claim 2, wherein the PWM control circuit maintains the output current in the first operating mode by controlling the first to fourth switch elements when the first voltage signal is between the ground voltage and the first reference voltage, and the PWM control circuit shifts the output current from the first operating mode to the second operating mode when the first voltage signal reaches the first reference voltage.

5. The motor drive circuit according to claim 1, wherein the PWM control circuit maintains the output current in the first operating mode by controlling the first to fourth switch elements when the second voltage signal is between the power supply voltage and the power supply voltage minus the first reference voltage, and the PWM control circuit shifts the output current from the first operating mode to the second operating mode by controlling the first to fourth switch elements when the second voltage signal reaches the power supply voltage minus the first reference voltage.

6. The motor drive circuit according to claim 5, wherein the PWM control circuit shifts the output current from the second mode to the first mode after a predetermined period of time has passed since the output current was shifted from the first mode to the second mode.

7. The motor drive circuit according to claim 4, wherein the PWM control circuit shifts the output current from the second mode to the first mode after a predetermined period of time has passed since the output current was shifted from the first mode to the second mode.

8. The motor drive circuit according to claim 1, wherein the PWM control circuit operates to turn off the first to fourth switches when the second voltage signal reaches the power supply voltage.

9. The motor drive circuit according to claim 1, wherein the PWM control circuit operates to turn off the first to fourth switches when the first voltage signal reaches the power supply voltage.

10. A motor drive circuit comprising:
an H bridge circuit including a first output terminal connected to one end of a motor coil, a second output terminal connected to the other end of the motor coil, a first switch element having one end connected to a power supply and the other end connected to the first output terminal, a second switch element having one end connected to ground and the other end connected to the first output terminal, a third switch element having one end connected to the power supply and the other end connected to the second output terminal, a fourth switch element having one end connected to the ground and the other connected to the second output terminal;
a PWM control circuit controlling an output current flowing into the motor coil based on a first voltage signal at the first output terminal and a second voltage signal at the second output terminal, and whether the output current flowing toward the first output terminal from the second output terminal is increasing or decaying;
an electric current detecting comparator that compares the first voltage signal with a first reference voltage and supplies a comparison result signal to the PWM control circuit; and
a zero point detecting comparator that compares the second voltage signal with a second reference voltage and supplies a comparison result signal to the PWM control circuit
wherein, when the output current is increasing, the second voltage signal is output through a first signal terminal and power supply voltage is output through a second signal terminal, and when the output current is decaying, the power supply voltage is output through the first signal terminal and the first voltage signal is output through the second signal terminal,
wherein the PWM control circuit controls the first to fourth switch elements based on comparison result signals that are generated based on the first voltage signal output through the first signal terminal and the second voltage signal output through the second signal terminal, and
wherein the PWM control circuit shifts the output current between a first operating mode during which the output current is increasing and a second operating mode during which the output current is decreasing by controlling the first to fourth switch elements, the PWM control circuit maintains the output current in the first operating mode when the second signal is between the power supply voltage and the power supply voltage minus the first reference voltage, and the PWM control circuit shifts the output current from the first operating mode to the second operating mode when the second signal reaches the power supply voltage minus the first reference voltage.

11. The motor drive circuit according to claim 10, wherein the PWM control circuit shifts the output current from the second operating mode to the first operating mode after a predetermined amount of time has elapsed since the output current shifted from the first mode to the second mode.

12. The motor drive circuit according to claim 10, wherein the PWM control circuit turns off the first to fourth switches when the second signal reaches the power supply voltage.

13. The motor drive circuit according to claim 10, wherein the PWM control circuit turns off the first to fourth switches when the first signal reaches the power supply voltage.

14. A motor drive circuit comprising:
an H bridge circuit including first and second output terminals on either side of a motor coil and a plurality of switch elements, and connected to a power supply;
a signal control circuit configured to receive first and second input signals from the H bridge circuit and output first and second output signals through first and second signal terminals, respectively, based on whether an output current flowing into the motor coil toward the first output terminal from the second output terminal is increasing or decaying;
a first comparator configured to compare a voltage of the first output signal with a voltage of the power supply less a voltage of a first reference signal, and outputting a first comparison signal;
a second comparator configured to compare a voltage of the second output signal with a voltage of a second reference signal, and outputting a second comparison signal; and
a PWM control circuit configured to control the output current flowing into the motor coil based on whether the output current flowing toward the first output terminal from the second output terminal is increasing or decaying and the first and second comparison signals.

15. The motor drive circuit according to claim 14, wherein the signal control circuit comprises:
a first transistor having one end connected to the power supply and another end connected to the first signal terminal,
a second transistor having one end connected to the first signal terminal and another end connected to the second output terminal,
a third transistor having one end connected to the power supply and another end connected to the second signal terminal, and
a fourth transistor having one end connected to the second signal terminal and another end connected to the first output terminal, wherein
the signal control circuit controls the first and second transistors to be on/off in a mutually exclusive manner, the third and fourth transistors to be on/off in a mutually exclusive manner, and the first and fourth transistors to be on/off in accordance with a mode signal from the PWM control circuit.

* * * * *